Dec. 13, 1949  A. M. SASGEN  2,490,923
QUICK ACTION C-CLAMP
Original Filed Jan. 15, 1943
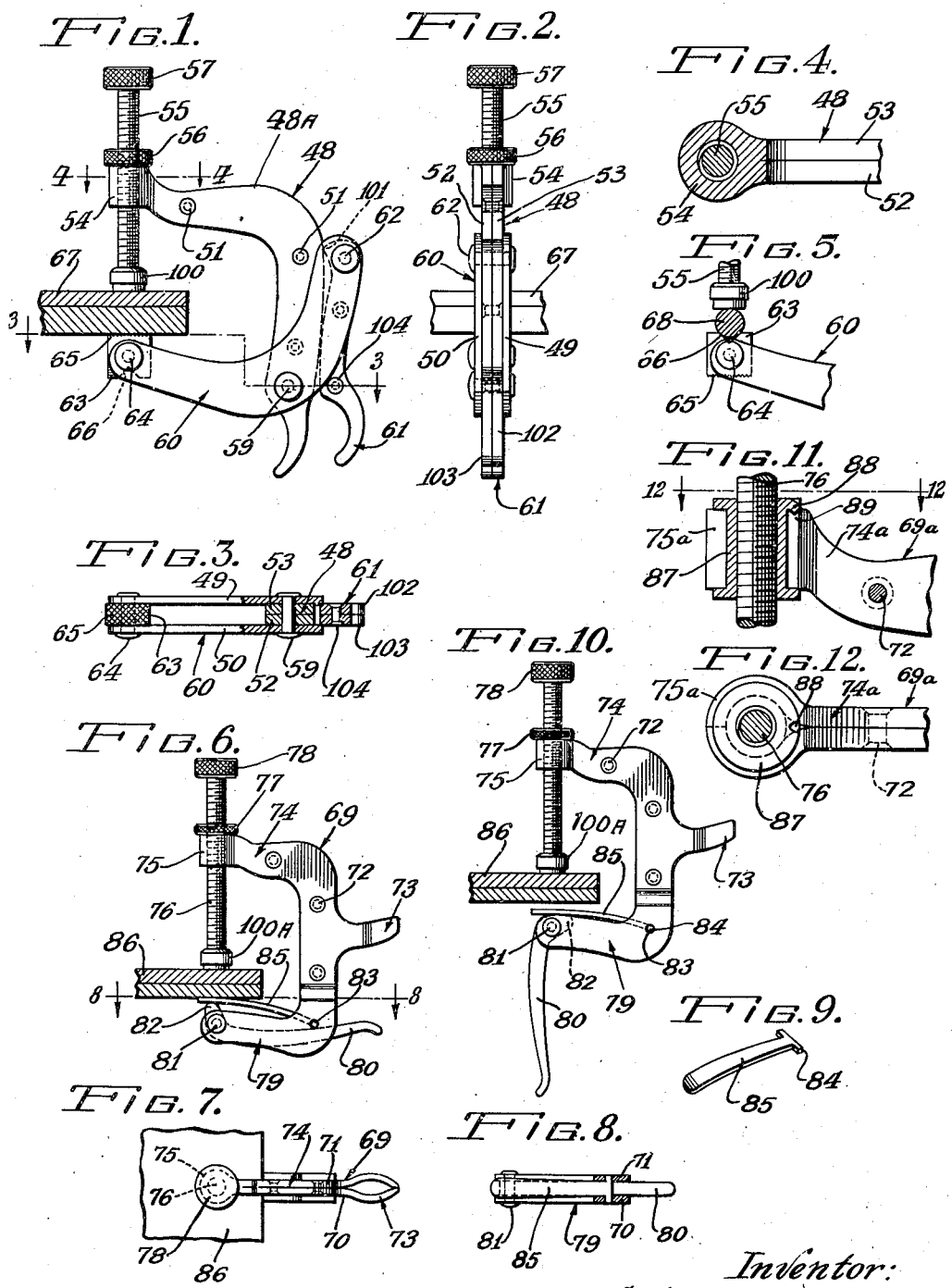
Inventor:
Anthony M. Sasgen
By Wallace and Cannon
Attorneys Patented Dec. 13, 1949

2,490,923

UNITED STATES PATENT OFFICE 2,490,923

QUICK ACTION C-CLAMP

Anthony M. Sasgen, Chicago, Ill.

Original application January 15, 1943, Serial No. 472,443. Divided and this application January 20, 1945, Serial No. 573,677

2 Claims. (Cl. 144—305)

This application is a division of my copending application Serial No. 472,443, filed January 15, 1943, and now issued as Patent No. 2,374,899.

This invention relates to clamps and more particularly to work-holding clamps which may be used either as a fastening means, to clamp work to a supporting member, or as a vise, to clamp work directly between the jaws thereof.

For the most part, the clamps heretofore known are rather cumbersome and difficult to manipulate so that an operator, in placing and securing the clamp in position is ofttimes required to use both hands. In some cases, due to the nature of the work to be held or the conditions under which the work is being performed, it is often difficult, if not impossible, for a workman to have two hands free to manipulate the clamping device and, as a result, where the old clamping devices have been used, it has been difficult to effectively use such devices.

Therefore, it is an object of my invention to afford a clamp which may be easily manipulated with one hand to secure the work in position.

Another object of the invention is to afford a new and improved work-holding clamp which may be made largely from relatively inexpensive structural elements or parts such as metal stampings.

An additional object of the invention is to afford a work-holding clamp embodying a novel arrangement of levers for manipulating one of the clamping jaws into operative engagement with the work.

A further object of the invention is to afford a work-holding clamp embodying a novel arrangement of levers for manipulating one of the clamping jaws into operative engagement with the work and which clamp embodies novel means for adjusting said one of said jaws relative to the other clamping jaw embodied in the clamp.

Still another object of the invention is to afford, in one embodiment of the invention, a novel manually operable latching device for latching engagement with and control of the movement of an adjustable screw which supports one of the clamping jaws embodied in the device.

A further object of the invention is to afford, in one embodiment thereof, a novel combination supporting arm and guide sleeve for the adjustable clamping screw which supports one of the clamping jaws embodied in the device.

An additional object of the invention is to afford, in one embodiment thereof, a clamp embodying a pivoted clamping jaw having a novel, efficient and relatively large and effective bearing surface for engagement with the work.

Further objects of my invention are to afford a clamp wherein a strong grip may be had on a piece of work by proper adjustment of a pivoted member and to afford a clamp wherein the grip thereof on a piece of work may be easily and quickly released.

Other and further objects of the present invention will be apparent from the following description and claims and are illustrated in the accompanying drawings which, by way of illustration, show preferred embodiments and the principles thereof and what I now consider to be the best modes in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 1 is an elevational view illustrating one form of the invention;

Fig. 2 is an edge elevational view of the form of the new clamping device which is shown in Fig. 1;

Fig. 3 is a view on line 3—3 in Fig. 1 partly in section and partly in top plan;

Fig. 4 is a view on line 4—4 in Fig. 1 partly in section and partly in top plan;

Fig. 5 is a detail view illustrating one use of the form of the new clamp which is illustrated in Figs. 1 to 5, inclusive;

Fig. 6 is a side elevational view illustrating a modification of the invention;

Fig. 7 is a top plan view of the modified form of the invention which is shown in Fig. 6 showing the parts of the clamp in effective or clamping position;

Fig. 8 is a view on line 8—8 in Fig. 6 partly in section and partly in plan;

Fig. 9 is a perspective view of a pivoted resilient clamping jaw, which is embodied in the form of the invention illustrated in Figs. 6 to 10, inclusive;

Fig. 10 is a view of the form of the new clamp which is shown in Figs. 6 to 10, inclusive, but showing the pivoted clamping jaw in released or ineffective position;

Fig. 11 is a detail view, partly in section, illustrating a modification of a part of the form of the new clamp which is illustrated in Figs. 6 to 10, inclusive; and Fig. 12 is a view on line 12—12 in Fig. 11 partly in section and partly in top plan.

For purposes of disclosure, the invention is illustrated in Figs. 1 to 5 of the drawings as embodied in a clamping device generally indicated at 48, and is shown associated with and as used upon work 67 which may be of various characters and such, for example, as laminated strips of wood which may be clampingly held together by the new clamping device. The form of the new clamping device 48 which is illustrated in Figs. 1 to 5, inclusive, comprises a clamping arm which includes a supporting frame 48A. The supporting frame 48A is preferably formed of a pair of complementary relatively light structural elements in the form of metal stampings 52 and 53, Figs. 2 and 4, secured together at selected spaced points by suitable fastening elements such as the rivets 51.

As best shown in Fig. 1 of the drawings, the supporting frame 48A of the clamp is shaped to afford an arm which extends approximately right-angularly from and relative to the body thereof, this arm being afforded by integral parts of the stampings 52 and 53, and, as shown in Fig. 4 of the drawings, the structural members or metal stampings 52 and 53 are, in this form of the invention, integrally joined, as by welding or the like, and are so formed or shaped as to provide a substantially cylindrical guide sleeve 54. This guide sleeve 54 is internally threaded for the reception of a threaded clamping screw 55 which works therethrough. The clamping screw 55 is provided at one end with a clamping jaw 100, which may be swivelly or otherwise mounted thereon, and at its other end the clamping screw 55 is provided with a knurled hand knob 57. Threaded upon the clamping screw 55, between the guide sleeve 54 and the hand knob 57, is a clamping or lock nut 56.

The form of the new clamping device which is illustrated in Figs. 1 to 5, inclusive, includes a second clamp arm 60 which is pivotally and adjustably mounted upon the supporting frame 48A of the clamp. As best shown in Fig. 3, the pivotal arm 60 is preferably formed from a pair of spaced and relatively light structural elements or members such as metal stampings or the like and which may be secured together in any suitable manner as, for example, in the manner which will be described presently. It will be noted, in this connection, that the pivotal clamp arm 60 carries a clamping jaw 63 and that the clamping jaw 63 includes a portion which is arranged between and attached to the spaced structural elements 49 and 50 of the pivotal arm 60 by means of a suitable fastening element such as the rivet 64. This rivet 64 also serves to secure the spaced structural elements 49 and 50 of the pivoted clamp arm 60 together. As shown in Figs. 1 and 3, the clamping jaw 63 has a knurled gripping surface 65 and this knurled gripping surface 65 while the opposite surface of the jaw 63 is provided with a transversely extending channel or recess 66, Fig. 5, for a reason which will be described hereinafter.

As shown in Fig. 3, the spaced structural elements 49 and 50 of the pivoted clamp arm 60 are provided with aligned openings adapted to be registered with the openings in the supporting frame 48A, this alignment being accomplished by inserting the body of the relatively narrower supporting frame 48A between the parts 49 and 50 of the pivoted clamp arm 60 to effect registry of the aforesaid openings. The pivotal connection between the clamp arm 60 and the supporting frame 48A of the other clamp arm may then be effected by inserting the pin 59 through the aligned openings in these two members.

The pivoted clamp arm 60 includes a manual operable operating lever 61 which is also preferably formed from a pair of relatively light structural elements such as the metal stampings 102 and 103 which may be secured together by any suitable fastening elements such as the rivets 104. The operating lever 61 is pivotally mounted upon the body of the clamp arm 60, as at 62, and includes a nose or cam portion 101 which is adapted to have camming engagement with the body of the supporting frame 48A as shown in Fig. 1.

In the use of the form of the invention which is illustrated in Figs. 1 to 5, inclusive, the arm 61 is rotated in a counterclockwise direction from the position shown in Fig. 1 to a released position wherein it extends in a right-hand direction from its pivot 62, and the clamping screw 55 may then be adjusted to bring the clamping jaw 100 carried thereby into engagement with one side or face of the work 67. This is accomplished by manipulating the hand knob 57, and when this adjustment is completed the clamping screw 55 and the clamping jaw 100 carried thereby may be secured or locked in the adjusted position by manipulating the clamping or lock nut 56 on the clamping screw 55 into engagement with the guide sleeve 54.

If the work is a flat-sided object, such as the work 67, the clamping jaw 63 may be rotated upon its pivot or mounting 64 so as to position or dispose the knurled surface 65 thereof for engagement with a flat surface of the work 67, opposite the clamping jaw 100, whereupon the thus positioned clamping jaw 63 may be moved into clamping engagement with the work 67 by rocking the lever 61 about its pivot 62 in a clockwise direction into the position in which the parts are shown in Fig. 1. This movement of the lever 61 moves the nose or cam portion 101 thereof into camming engagement with the body or supporting frame of the clamp arm 48 and thereby rocks the clamp arm 60, about its pivot 59, upon and relative to the clamp arm or body 48A, thus moving the clamping jaw 65, which is carried by the clamp arm 60, into clamping engagement with the work 67.

However, in certain instances, it may be desirable to clamp a round or cylindrical object between the clamping jaws 63 and 100. In such instances, the clamping jaw 63 may be rotated upon its mounting 64 so as to bring the channeled or recessed surface 66 thereof into a position opposite or in clamping relationship with the clamping jaw 100. A round or cylindrical object, such as 68, Fig. 5, may then be disposed upon the channeled surface 67 of the clamping jaw 63 and the clamping jaw 63 moved into clamping engagement by manipulation of the hand lever 61, in the manner hereinbefore described.

Another modification of the invention is shown in Figs. 6 to 10, inclusive, and in this form of the invention the two clamp-supporting arms 74 and 79 are formed as integral parts of the frame or body 69 of the clamp which, in turn, is preferably formed of a pair of relatively light structural elements 70 and 71, such as metal stampings or the like, which are fastened together by suitable fastening elements such as the rivets 72. In this form of the invention the two clamp-supporting arms 74 and 79 extend substantially or in general parallel to each other and the structural parts or elements 70 and 71 of the clamp-supporting arms 74 are integrally joined and shaped to provide a substantially cylindrical guide sleeve 75, which is similar to the guide sleeve 54.

The guide sleeve 75, like the guide sleeve 54, is internally threaded and a clamping screw 76 is threaded therethrough. This clamping screw 76 is provided at one end with a knurled hand knob 78 and at its other end the clamping screw 76 carries a clamping jaw 100A which may be swivelly or otherwise mounted upon the clamping screw 76. A knurled clamping or lock nut 77 is threaded onto the clamping screw 76 between the guide sleeve 75 and the knurled hand knob 78.

A hand lever 80 is pivotally mounted upon the clamp-supporting arm 75, as at 81, and between the structural elements or parts 70 and 71 of the clamp-supporting arm 79. The lever 78 has a cam or nose portion 82 and this cam or nose portion 82 of the hand lever 80 is engageable with one surface of a resilient clamping member 85 which is preferably formed of a piece of resilient flat metal spring stock slightly curved, as shown in Figs. 6, 9 and 10. The resilient clamping member 85 is provided at one end with a pair of laterally extending ears 84 and these ears 84 project into openings 83 which are provided in the structural elements 70 and 71 of the clamp, and are inserted therein prior to the time the structural elements 70 and 71 are riveted or otherwise fastened together, as at 72. In this manner the resilient clamping member 85 is pivotally mounted upon and relative to the clamp-supporting arm.

As shown in Figs. 6, 7 and 10, the body of the clamp 69 is provided with a handle or thumb rest portion 73 which is formed as an integral extension of the structural elements 70 and 71 which are, as shown in Fig. 13, preferably bent outwardly relative to each other so as to afford a relatively wide thumb rest when using this form of the new clamp, as will be explained presently.

The use and operation of the form of the new clamp shown in Figs. 6 to 10, inclusive, of the drawings, are as follows: The clamping jaw 100A may be positioned in engagement with one side of the work 86 by manipulating the hand knob 78 of the clamping screw 76, whereupon the clamping nut 77 may be adjusted into engagement with the guide sleeve 75. The hand lever 80 may then be pivoted from its normal or ineffective position, as in Fig. 10, into effective or clamping position as in Fig. 6. This may be accomplished by placing the thumb upon the thumb rest portion 73 and grasping the hand lever 80 with the same hand. When the hand lever 80 is thus moved from its normal or ineffective position, as in Fig. 10, into effective or clamping position as in Fig. 6, the nose or cam portion 82 thereof bears or cams against one surface of the resilient clamping member 85 and urges the latter into clamping engagement with the work 86 at the side thereof which is opposite the clamping jaw 100A.

It will be noted, in this connection, that when the resilient clamping member 85 is in effective or clamping position it provides a relatively large bearing or clamping surface which is more effective than the relatively small clamping surface of the nose or cam portion 82 of the lever 80 would be if it engaged directly with the work inasmuch as there would be a tendency for such a relatively small cam surface as might be afforded by the nose or cam portion 82 of the lever 80 to slip relative to the work or to permit the work to slip relative thereto.

In order to release the parts of the form of the new clamp shown in Figs. 6 to 10, inclusive, it is merely necessary to manipulate the clamping lever 80 from effective or clamping position in which it is shown in Fig. 6 into ineffective position in which it is shown in Fig. 10, without changing the adjustment of the clamping screw 76 and its clamping jaw 100A upon or relative to the clamp-supporting arm 74.

A modified construction of one part of the form of the invention which is shown in Figs. 6 to 10, inclusive, is illustrated in Figs. 11 and 12. This modification is substantially similar to the form of the invention which is illustrated in Figs. 6 to 10, inclusive, and parts thereof which correspond to parts in the form of the invention which are shown in Figs. 6 to 10, inclusive, have been given the same reference numerals followed by the additional reference character "a."

In the form of the invention which is shown in Figs. 11 and 12, internal threads are omitted from the guide sleeve for the clamping screw and the guide sleeve 75a is made somewhat larger, in diameter, than the guide sleeve 75 for the reception of an internally threaded flanged metallic bushing 87. This bushing 87 is inserted into the guide sleeve 75a and may be secured to the guide sleeve 75a in any suitable manner as by peening one flange portion 88 thereof into a resultant indented portion of the guide sleeve 75a, as shown at 87 in Fig. 11. Except as thus described, however, the modification which is illustrated in Figs. 11 and 12 is substantially similar in construction, use and operation to the form of the invention which is illustrated in Figs. 6 to 10, inclusive, and hence need not be described in further detail.

It will be noted that in all of the several forms thereof which are illustrated in the drawings the pivoted clamp arm and the clamping jaw carried or controlled thereby, may be manipulated into and out of effective or clamping position relative to and without disturbing the position or adjustment of the other clamp arm and the clamping screw and clamping jaw carried thereby. This enables the operator or user of the new clamp to manipulate the same and to shift the clamp upon or relative to the work with and by the use of only one hand, leaving the other hand free for necessary work.

It will thus be seen from the foregoing description, considered in conjunction with the accompanying drawings, that the present invention provides a new and improved clamping device and accomplishes its intended objects and has the desirable advantages and characteristics including those hereinbefore pointed out and others which are inherent in the invention.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A clamp comprising a frame embodying a pair of relatively light metal stamping elements rigidly connected together, said stamping elements terminating in upper and lower supporting arms with said lower arm arranged in spaced relation, a manually operable clamping screw mounted in said upper supporting arm, a clamping jaw secured to an end of said clamping screw, a resilient clamping jaw having one end disposed between said metal stamping elements at the inner end of the lower supporting arm and extending in parallelism and overlying the lower supporting arm, said resilient clamping jaw provided with means extending through said metal stamping elements for pivotally connecting said clamping jaw to said frame, a lever pivotally mounted between said metal stamping elements at the outer end of the lower supporting arm and in axial alignment with said clamping screw and positioned beneath the free end of said resilient clamping jaw, a cam formed on said lever and engageable with the free end of said resilient clamping jaw for moving said jaw into clamping relationship with the first mentioned clamping jaw upon the actuation of said lever.

2. A clamp comprising a frame embodying a pair of light metal stamping elements rigidly connected together, said stamping elements terminating in upper and lower arms with said lower arm arranged in spaced relation, the metal stamping elements constituting the upper arm being formed to provide an internally threaded guide sleeve, a manually operable clamping screw disposed in said guide sleeve, a clamping jaw secured to an end of said clamping screw, a resilient clamping jaw having one end disposed between said metal stamping elements at the inner end of the lower supporting arm and extending in parallelism and overlying the lower supporting arm, said resilient clamping jaw provided with means extending through said metal stamping elements for pivotally connecting said clamping jaw to said frame, a lever pivotally mounted between said metal stamping elements at the outer end of the lower supporting arm and in axial alignment with said clamping screw and positioned beneath the free end of said resilient clamping jaw, a cam formed on said lever and engageable with the free end of said resilient clamping jaw for moving said jaw into clamping relationship with the first mentioned clamping jaw upon the actuation of said lever, said stamping elements having projections formed thereon intermediate the upper and lower arms and arranged in spaced relation to define a thumb rest portion whereby said lever may be manipulated by the operator of said clamp by placing the thumb of the one hand upon said thumb rest portion and manipulating said lever with the fingers of the same hand.

ANTHONY M. SASGEN.

REFERENCES CITED

The following references are of record in the file of this patent:

UNITED STATES PATENTS

| Number | Name | Date |
|---|---|---|
| 757,142 | Parson | Apr. 12, 1904 |
| 809,882 | Wrigley | Jan. 9, 1906 |
| 1,319,717 | Marbach | Oct. 28, 1919 |
| 1,490,063 | Power | Apr. 8, 1924 |
| 1,506,481 | Graffam | Aug. 26, 1924 |
| 1,519,187 | Braley | Dec. 16, 1924 |
| 1,952,453 | Mueller | Mar. 27, 1934 |
| 2,255,320 | Kotchi | Sept. 9, 1941 |
| 2,333,071 | Jannisse et al. | Oct. 26, 1943 |
| 2,343,699 | Petersen | Mar. 7, 1944 |

FOREIGN PATENTS

| Number | Country | Date |
|---|---|---|
| 463,153 | Germany | July 23, 1928 |